(12) United States Patent
Durham

(10) Patent No.: US 10,502,299 B2
(45) Date of Patent: Dec. 10, 2019

(54) TURBINE WHEEL FOR HYDROKINETIC TORQUE CONVERTER, AND METHOD OF MAKING THE SAME

(71) Applicant: VALEO KAPEC CO., LTD., Daegu (KR)

(72) Inventor: Patrick Durham, Troy, MI (US)

(73) Assignee: Valeo Kapec Co., Ltd., Daegu (KR)

( * ) Notice: Subject to any disclaimer, the term of this patent is extended or adjusted under 35 U.S.C. 154(b) by 77 days.

(21) Appl. No.: 15/939,000

(22) Filed: Mar. 28, 2018

(65) Prior Publication Data

US 2019/0301580 A1  Oct. 3, 2019

(51) Int. Cl.
*F16H 41/28* (2006.01)
*F16H 41/04* (2006.01)
*F16H 45/02* (2006.01)

(52) U.S. Cl.
CPC ............ *F16H 41/28* (2013.01); *F16H 41/04* (2013.01); *F16H 45/02* (2013.01); *F16H 2045/0221* (2013.01)

(58) Field of Classification Search
CPC .. F16H 41/28; F16H 41/04; F16H 2045/0221; F16H 45/02
See application file for complete search history.

(56) References Cited

U.S. PATENT DOCUMENTS

| 5,507,622 A | * | 4/1996 | Avny | F16H 41/28 |
| | | | | 416/180 |
| 2016/0305523 A1 | * | 10/2016 | Depraete | F16H 41/28 |
| 2017/0191377 A1 | * | 7/2017 | Longacre | F01D 25/164 |
| 2017/0241529 A1 | * | 8/2017 | Depraete | F16H 41/28 |

* cited by examiner

*Primary Examiner* — Thomas E Lazo
(74) *Attorney, Agent, or Firm* — Berenato & White, LLC

(57) ABSTRACT

A turbine wheel for a hydrokinetic torque converter. The turbine wheel is rotatable about a rotational axis and comprises an annular turbine shell member coaxial with the rotational axis and made of metallic material, and a plurality of turbine blades. The turbine shell member has an axially inner peripheral surface and an axially outer peripheral surface axially opposite to the axially inner peripheral surface. The turbine blades extend from the axially inner peripheral surface of the turbine shell member. The turbine blades are made of polymeric material as a single-piece component and are directly non-moveably secured to the turbine shell member.

21 Claims, 14 Drawing Sheets

Fig. 4
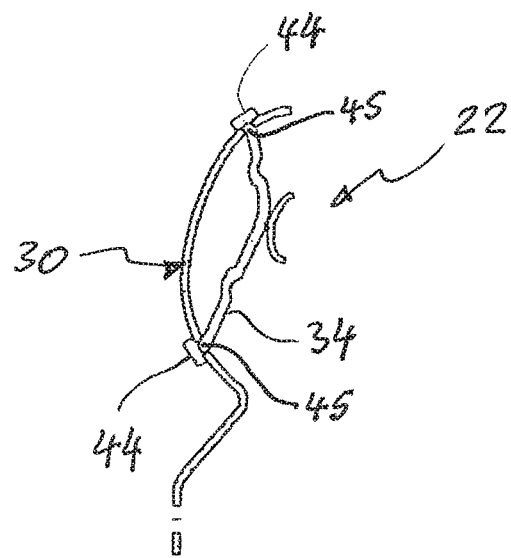
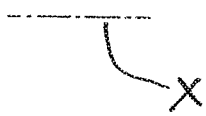
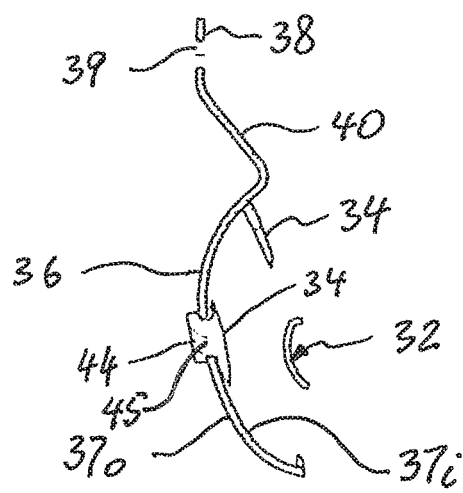

TURBINE WHEEL FOR HYDROKINETIC TORQUE CONVERTER, AND METHOD OF MAKING THE SAME

BACKGROUND OF THE INVENTION

1. Field of the Invention

The present invention generally relates to fluid coupling devices, and more particularly to a turbine wheel for hydrokinetic torque converters, and a method of making the same.

2. Background of the Invention

Typically, a hydrokinetic torque converter includes an impeller wheel, a turbine wheel, a stator (or reactor) fixed to a casing of the torque converter, and a one-way clutch for restricting rotational direction of the stator to one direction. The turbine wheel is integrally or operatively connected with a hub linked in rotation to a driven shaft, which is itself linked typically to an input shaft of a transmission of a vehicle. The casing of the torque converter generally includes a front cover and an impeller shell which together define a fluid filled chamber. Impeller blades are fixed to an impeller shell within the fluid filled chamber to define the impeller assembly. The turbine wheel and the stator are also disposed within the chamber, with both the turbine wheel and the stator being relatively rotatable with respect to the front cover and the impeller shell.

The turbine wheel includes a substantially annular, semi-toroidal (or concave) turbine shell, a substantially annular turbine core ring and a plurality of turbine blades. Conventionally, the turbine shell, the turbine core ring and the turbine blades are typically formed separately by stamping from steel blanks. The turbine blades are fixedly (i.e., non-moveably) attached, such as by brazing, to the turbine shell and the turbine core ring. In other words, current manufacturing techniques for the turbine wheel are labor intensive, use expensive brazing process, and sometimes must be baked to finalize assembly of the turbine wheel.

The turbine assembly works together with the impeller assembly, which is linked in rotation to the casing that is itself linked in rotation to a driving shaft driven by an internal combustion engine. The stator is interposed axially between the turbine assembly and the impeller assembly, and is mounted so as to rotate on the driven shaft with the interposition of the one-way clutch.

Current hydrokinetic torque converters and methods for assembly thereof are quite complex, cumbersome and expensive. Therefore, while conventional hydrokinetic torque converters, including but not limited to those discussed above, have proven to be acceptable for vehicular driveline applications and conditions, improvements that may enhance their performance and cost are possible.

BRIEF SUMMARY OF THE INVENTION

According to a first aspect of the invention, there is provided a turbine wheel for a hydrokinetic torque converter. The turbine wheel is rotatable about a rotational axis and comprises an annular turbine shell member coaxial with the rotational axis and made of a metallic material, and a plurality of turbine blades. The turbine shell member has an axially inner peripheral surface and an axially outer peripheral surface axially opposite to the axially inner peripheral surface. The turbine blades extend from the axially inner peripheral surface of the turbine shell member. Each of the turbine blades is made of polymeric material as a single-piece component and is directly non-moveably secured to the turbine shell member.

According to a second aspect of the present invention, there is provided a hydrokinetic torque converter rotatable about a rotational axis. The torque converter comprises an impeller wheel coaxial with the rotational axis, and a turbine wheel disposed axially opposite to the impeller wheel. The turbine wheel is coaxially aligned with and is hydro-dynamically drivable by the impeller wheel. The impeller wheel includes an impeller shell and a plurality of impeller blades outwardly extending from the impeller shell. The turbine wheel includes an annular turbine shell member coaxial with the rotational axis and made of metallic material, and a plurality of turbine blades. The turbine shell member has an axially inner peripheral surface and an axially outer peripheral surface axially opposite to the axially inner peripheral surface. The turbine blades extend from the axially inner peripheral surface of the turbine shell member. Each of the turbine blades is made of polymeric material as a single-piece component and is directly non-moveably secured to the turbine shell member.

According to a third aspect of the present invention, there is provided a method for manufacturing a turbine wheel of a hydrokinetic torque converter. The method comprises the steps of forming an annular turbine shell member of a metallic material, and forming a plurality of turbine blades. The turbine shell member has an inner peripheral surface and an outer peripheral surface axially opposite to the axially inner peripheral surface. The turbine blades are formed in situ on the axially inner peripheral surface of the turbine shell member. Each of the turbine blades is formed, such as by molding, in situ of a polymeric material as a single-piece component and is directly non-moveably secured to the turbine shell member.

Other aspects of the invention, including apparatus, devices, systems, converters, processes, and the like which constitute part of the invention, will become more apparent upon reading the following detailed description of the exemplary embodiments.

BRIEF DESCRIPTION OF THE SEVERAL VIEWS OF THE DRAWING(S)

The accompanying drawings are incorporated in and constitute a part of the specification. The drawings, together with the general description given above and the detailed description of the exemplary embodiments and methods given below, serve to explain the principles of the invention. The objects and advantages of the invention will become apparent from a study of the following specification when viewed in light of the accompanying drawings, in which like elements are given the same or analogous reference numerals and wherein:

FIG. 4 is a partial sectional view of the turbine wheel taken along the line 4-4 in FIG. 3;

Figure 13:
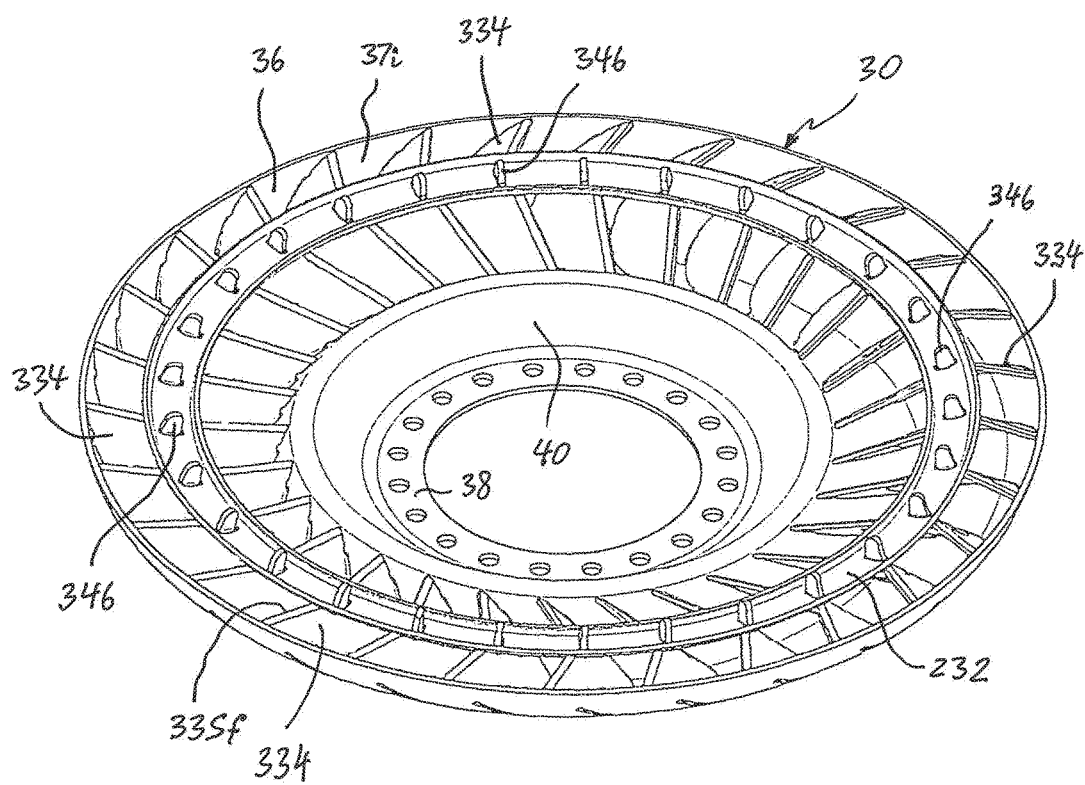
Figure 14:
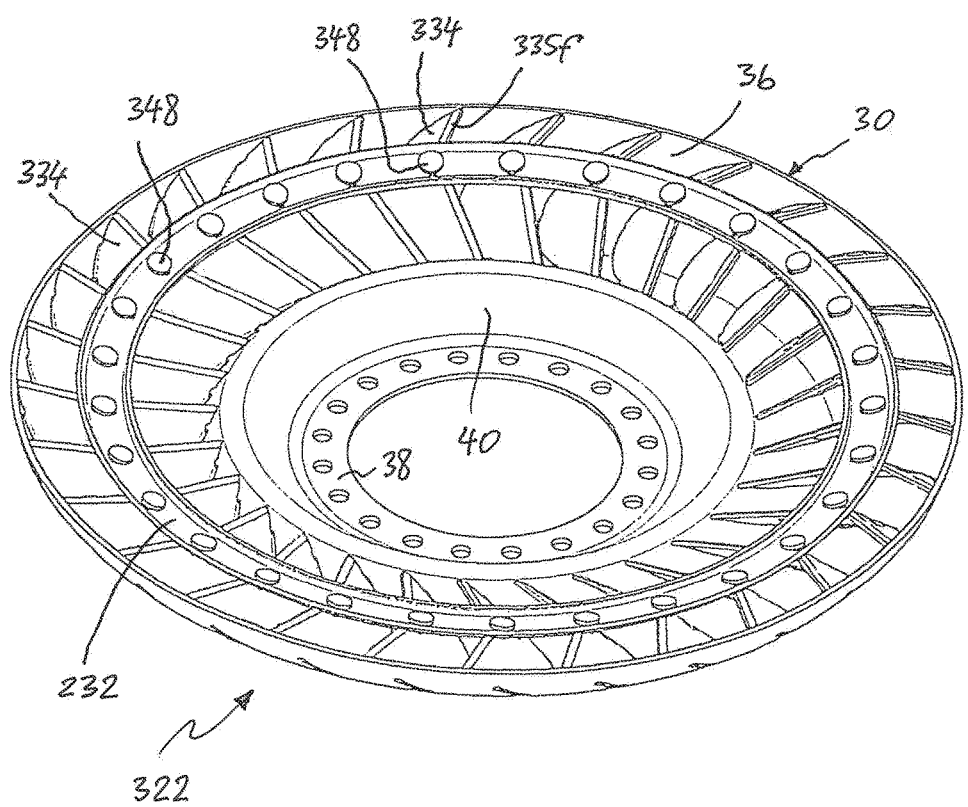

FIG. 13 is a fragmentary perspective view of a turbine wheel in accordance with a fourth exemplary embodiment of the present invention with turbine blades mounted to a turbine core ring before hot staking; and FIG. 14 is a fragmentary perspective view of the turbine wheel in accordance with the fourth exemplary embodiment of the present invention with the turbine blades mounted to the turbine core ring after hot staking.

DETAILED DESCRIPTION OF EXEMPLARY EMBODIMENT(S) AND EMBODIED METHOD(S) OF THE INVENTION

Reference will now be made in detail to exemplary embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in connection with the exemplary embodiments and methods.

This description of exemplary embodiments is intended to be read in connection with the accompanying drawings, which are to be considered part of the entire written description. In the description, relative terms such as "horizontal," "vertical," "up," "down," "upper", "lower", "right", "left", "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. The term "integral" (or "unitary") relates to a part made as a single part, or a part made of separate components fixedly (i.e., non-moveably) connected together. Additionally, the word "a" and "an" as used in the claims means "at least one" and the word "two" as used in the claims means "at least two".

Figure 1:
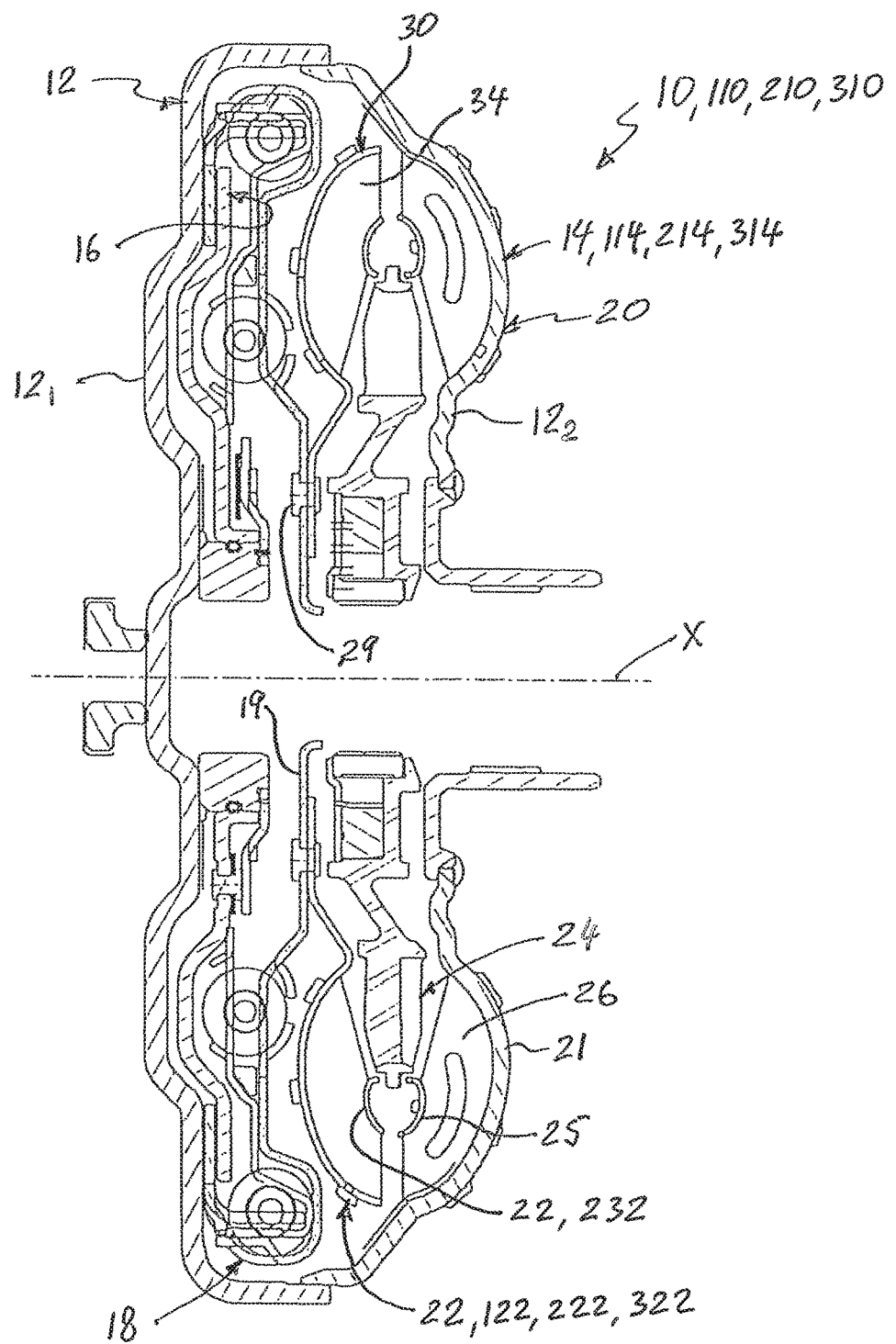
FIG. 1 is a fragmented sectional view in axial section of a hydrokinetic torque-coupling device with a turbine wheel in accordance with an exemplary embodiment of the present invention.

An exemplary embodiment of a hydrokinetic torque-coupling device is generally represented in FIG. 1 by reference numeral 10. The hydrokinetic torque-coupling device 10 is intended to couple driving and driven shafts, for example of a motor vehicle. In this case, the driving shaft is an output shaft of an internal combustion engine (not shown) of the motor vehicle and the driven shaft is connected to an automatic transmission (not shown) of the motor vehicle.

The hydrokinetic torque-coupling device 10 comprises a sealed casing 12 filled with oil and rotatable about a rotation axis X. The hydrokinetic torque coupling device 10 further comprises a hydrodynamic torque converter 14, a lock-up clutch 16, and a torsional vibration damper 18, all disposed in the sealed casing 12. The torsional vibration damper 18 is mounted to the torque converter 14. The sealed casing 12, the torque converter 14, the lock-up clutch 16, and a torsional vibration damper 18 are all rotatable about the rotational axis X. As is known in the art, the torque-coupling device 10 is symmetrical about the rotational axis X. Hereinafter the axial and radial orientations are considered with respect to the rotational axis X of the torque-coupling device 10. The relative terms such as "axially," "radially," and "circumferentially" are with respect to orientations parallel to, perpendicular to, and circularly around the rotational axis X, respectively.

The sealed casing 12 according to the present invention as illustrated in FIG. 1 includes a first casing (or cover) shell $12_1$ and a second casing (or impeller) shell $12_2$ disposed coaxially with and axially opposite to the first casing shell $12_1$. The first and second casing shells $12_1$, $12_2$ are non-movably (i.e., fixedly) interconnected sealingly together, such as by welding at their outer peripheries. The first casing shell $12_1$ is non-movably (i.e., fixedly) connected to the driving shaft, more typically to a flexplate that is non-rotatably fixed to the driving shaft, so that the casing 12 turns at the same speed at which the engine operates for transmitting torque. Each of the first and second casing shells $12_1$, $12_2$ may be made, for example, integrally by press-forming one-piece metal sheets.

The torque converter 14 comprises an impeller wheel (sometimes referred to as the pump or impeller assembly) 20, a turbine wheel (sometimes referred to as the turbine assembly) 22, and a stator (sometimes referred to as the reactor) 24 interposed axially between the impeller wheel 20 and the turbine wheel 22. The impeller wheel 20, the turbine wheel 22, and the stator 24 are coaxially aligned with one another and the rotational axis X. The impeller wheel 20, the turbine wheel 22, and the stator 24 are all rotatable about the rotational axis X. The impeller wheel 20, the turbine wheel 22, and the stator 24 collectively form a torus. The impeller wheel 20 and the turbine wheel 22 may be fluidly coupled to one another in operation as known in the art.

The impeller wheel 20 includes a substantially annular, semi-toroidal (or concave) impeller shell 21, a substantially annular impeller core ring 25, and a plurality of impeller blades 26 fixedly (i.e., non-moveably) attached, such as by brazing, to the impeller shell 21 and the impeller core ring 25. Thus, a portion of the second casing shell $12_2$ of the casing 12 also forms and serves as the impeller shell 21 of the impeller wheel 20. Accordingly, the impeller shell 21 sometimes is referred to as part of the casing 12. The impeller wheel 20, including the impeller shell 21, the impeller core ring 25 and the impeller blades 26, is non-rotatably secured to the first casing shell 12₁ and hence to the drive shaft (or flywheel) of the engine to rotate at the same speed as the engine output.

The turbine wheel 22, as best shown in FIGS. 1-4, comprises a substantially annular turbine shell member 30, a substantially annular turbine core ring 32, and a plurality of turbine blades 34 axially extending between the turbine shell member 30 and the turbine core ring 32. The turbine blades 34 extend axially inwardly from the turbine shell member 30 so as to face the impeller blades 26 of the impeller wheel 20. The turbine blades 34 are non-movably (i.e., fixedly) secured between the turbine shell member 30 and the turbine core ring 32 of the turbine wheel 22. In other words, the turbine blades 34 of the turbine wheel 22 are fixedly secured to both the turbine shell portion 36 of the turbine shell member 30 and the turbine core ring 32 of the turbine wheel 22. Conventionally, the impeller blades 26 of the impeller wheel 20 are provided to interact, in a known manner, with the turbine blades 34 of the turbine wheel 22 and stator blades of the stator 24.

Figure 2:
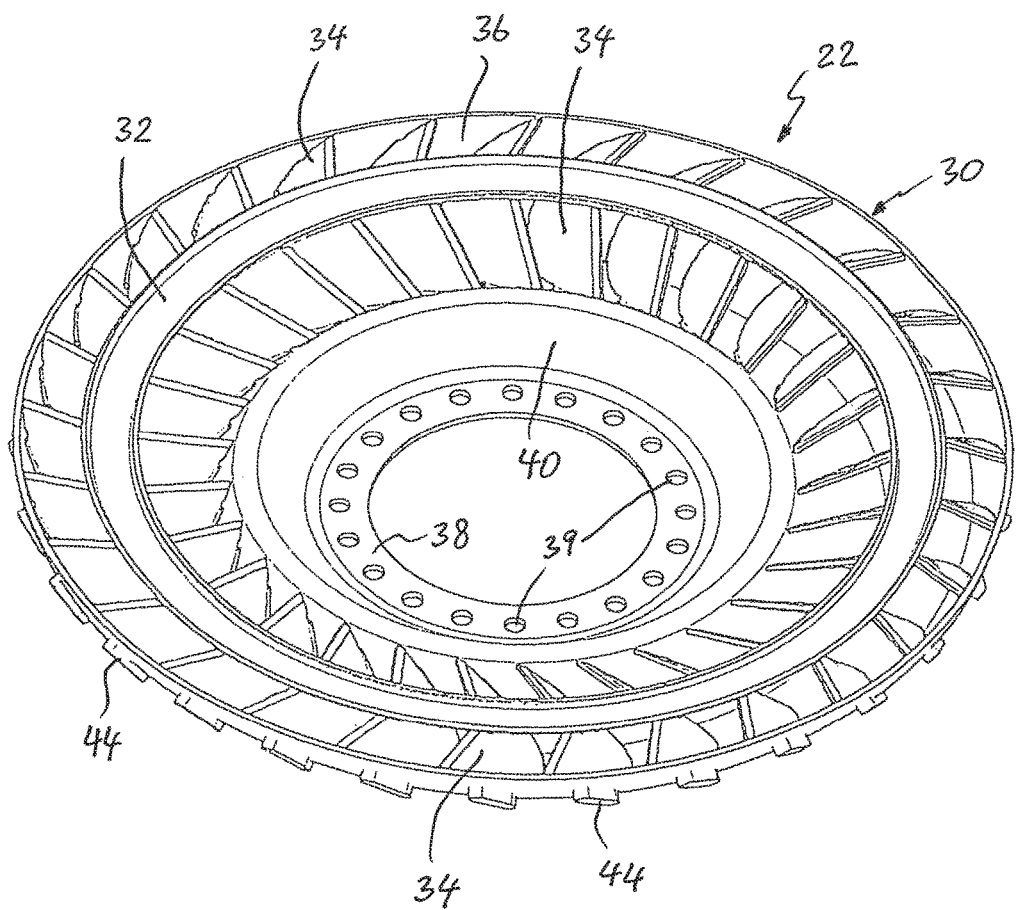
FIG. 2 is a perspective view of a turbine wheel in accordance with a first exemplary embodiment of the present invention.
Figure 3:
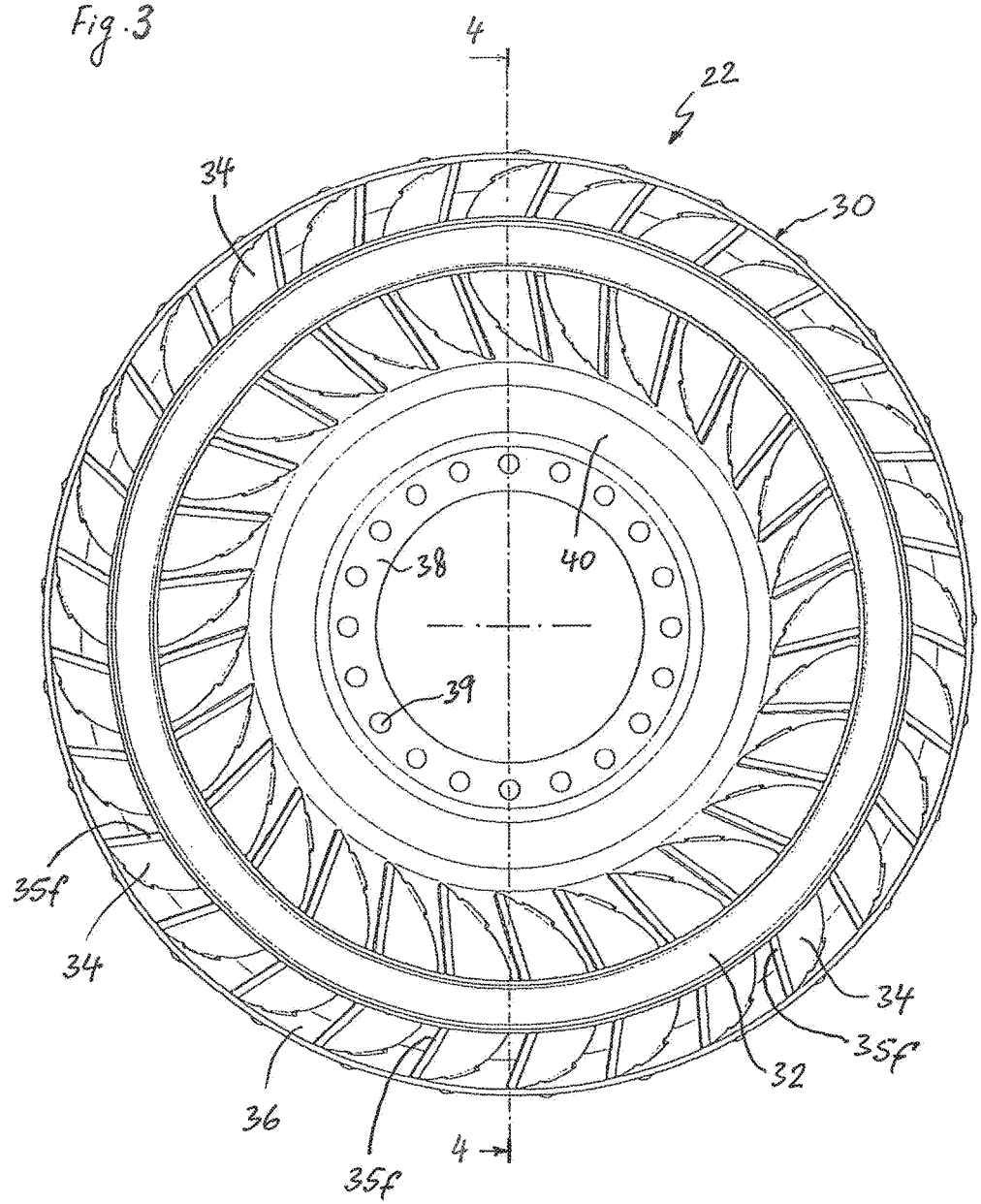
FIG. 3 is a front view of the turbine wheel in accordance with the first exemplary embodiment of the present invention.
Figure 5:
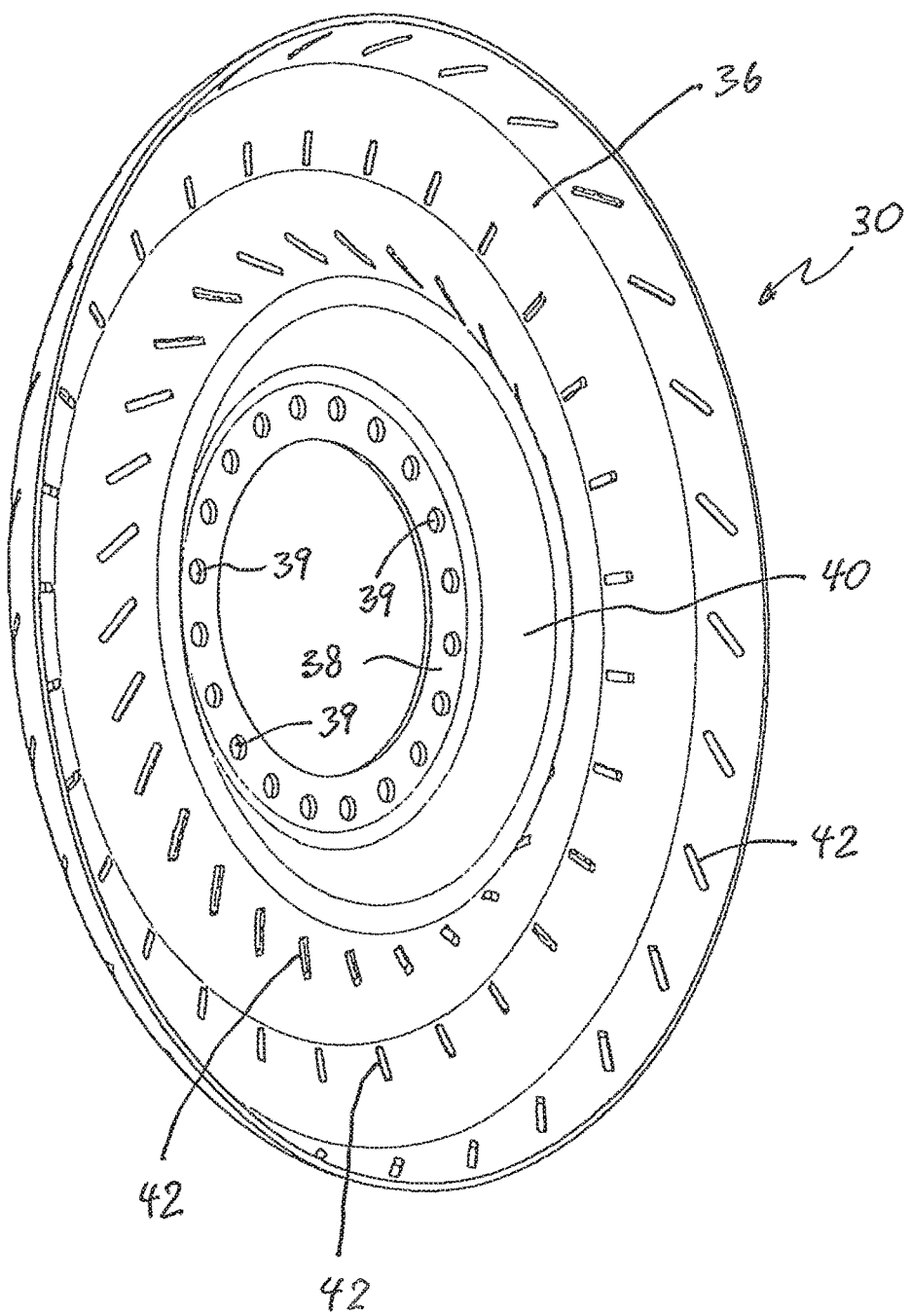
FIG. 5 is a perspective view of a turbine shell portion of the turbine wheel in accordance with the exemplary embodiment of the present invention.
Figure 6:
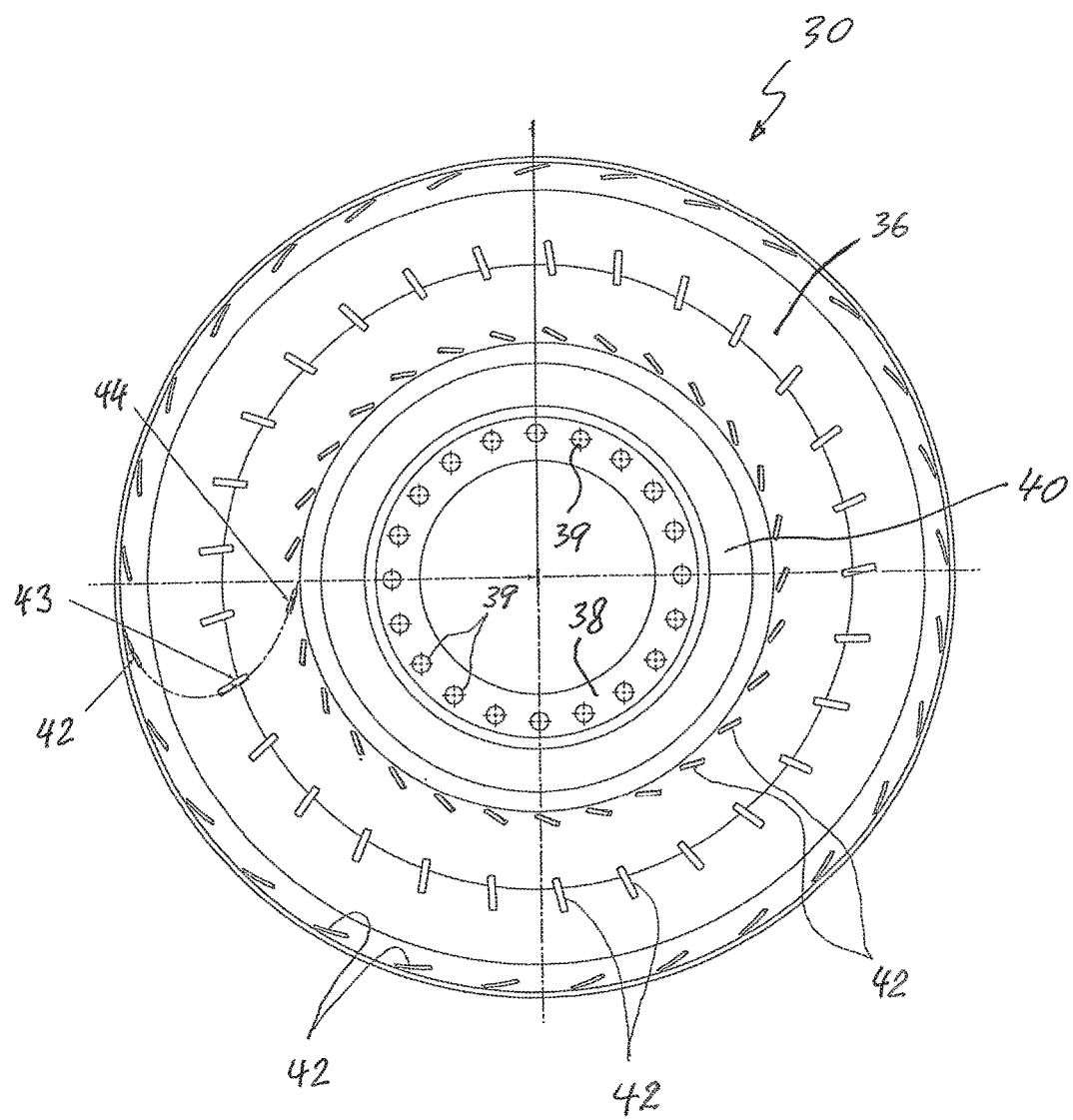
FIG. 6 is a front view of the turbine shell portion of the turbine wheel in accordance with the exemplary embodiment of the present invention.

Furthermore, the turbine shell member 30, as best shown in FIGS. 4-6, includes a substantially annular, semi-toroidal (or concave) turbine shell portion 36, a radially extending turbine flange portion 38, and a connecting portion 40 extending obliquely between the turbine shell portion 36 and the turbine flange portion 38. The turbine shell member 30 of the turbine wheel 22 is non-movably (i.e., fixedly) secured to an output member 19 of the torsional vibration damper 18 by appropriate means, such as by rivets 29 or other mechanical fasteners extending through openings 39 through the turbine flange portion 38 (as best shown in FIGS. 1 and 2), or by welding.

The turbine shell member 30, including the turbine shell portion 36, the turbine flange portion 38 and the connecting portion 40, is formed unitarily as a single-piece component from a metal (such as steel or aluminum) by press-forming (or stamping) or casting. Moreover, the semi-toroidal turbine shell portion 36 has a concave, axially inner peripheral surface 37i, and a convex, axially outer peripheral surface 37o. Similarly, the turbine core ring 32 is formed unitarily from a metal (such as steel or aluminum) by press-forming (or stamping) or casting as a single-piece component. Specifically, as best shown in FIGS. 5 and 6, the turbine shell portion 36 of the turbine shell member 30 has a plurality of mounting slots (through-openings) 42 formed through the turbine shell portion 36. The mounting slots 42 are radially and circumferentially spaced from each other.

According to the exemplary embodiment of the present invention, the turbine blades 34 are molded in one piece from a polymeric material (or polymer) including technical plastics, such as polyamide-imides (such as Torlon™), polyether ether ketone (PEEK), a thermoplastic polymer (an organic thermoplastic polymer in the polyaryletherketone (PAEK) family), nylon and carbon fibers (e.g., Carbon Fiber CFF™), and resins, such as PLASTCure Rigid, etc. PEEK polymer, for example, provides fatigue and chemical resistance, can operate at high temperatures and retains outstanding mechanical properties at continuous-use temperatures of up to 240° C. (464° F.), allowing it to replace metal even in the most severe end-use environments of torque converters. Moreover, the technical plastics and resins have a volumetric mass density lower than that of steel, thus reducing weight.

Figure 7:
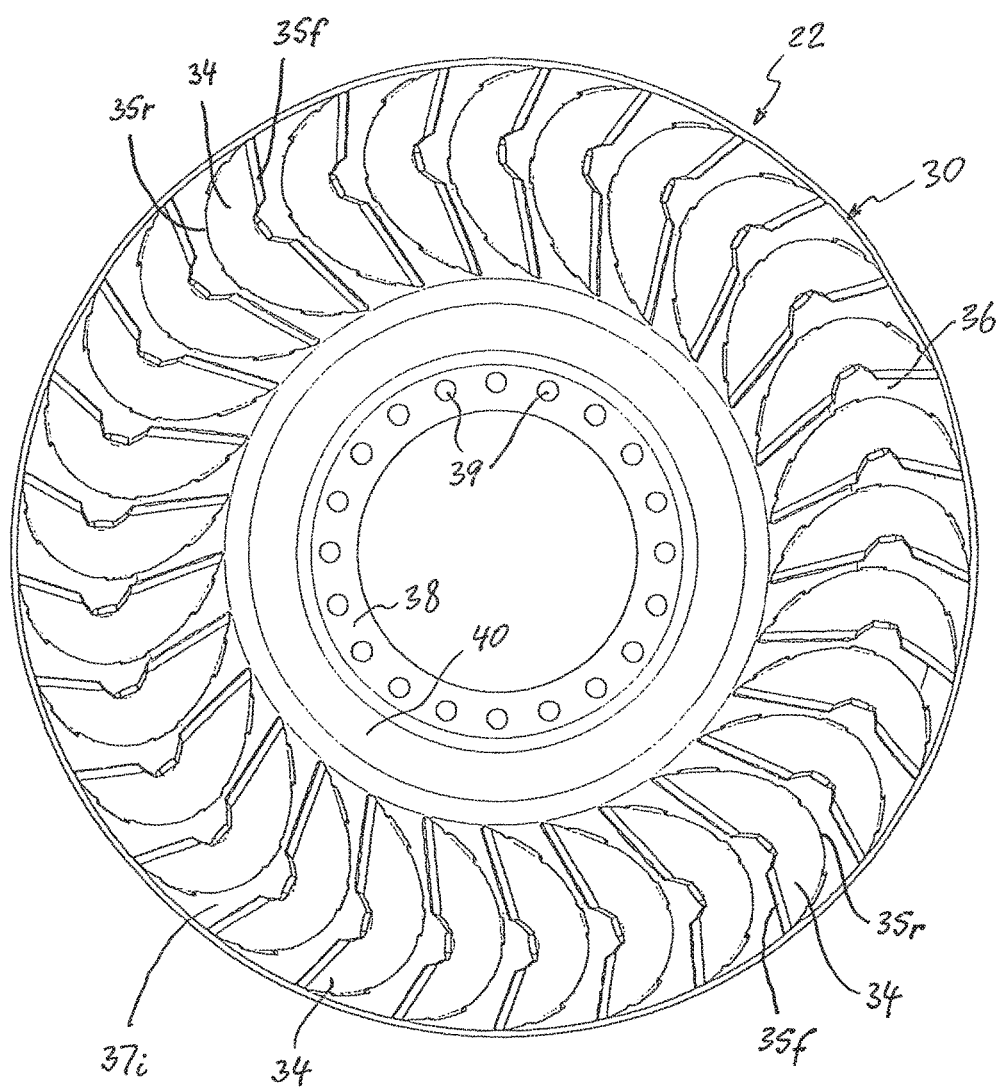
FIG. 7 is a front view of the turbine shell portion with in situ molded turbine blades of the turbine wheel in accordance with the first exemplary embodiment of the present invention.
Figure 8:
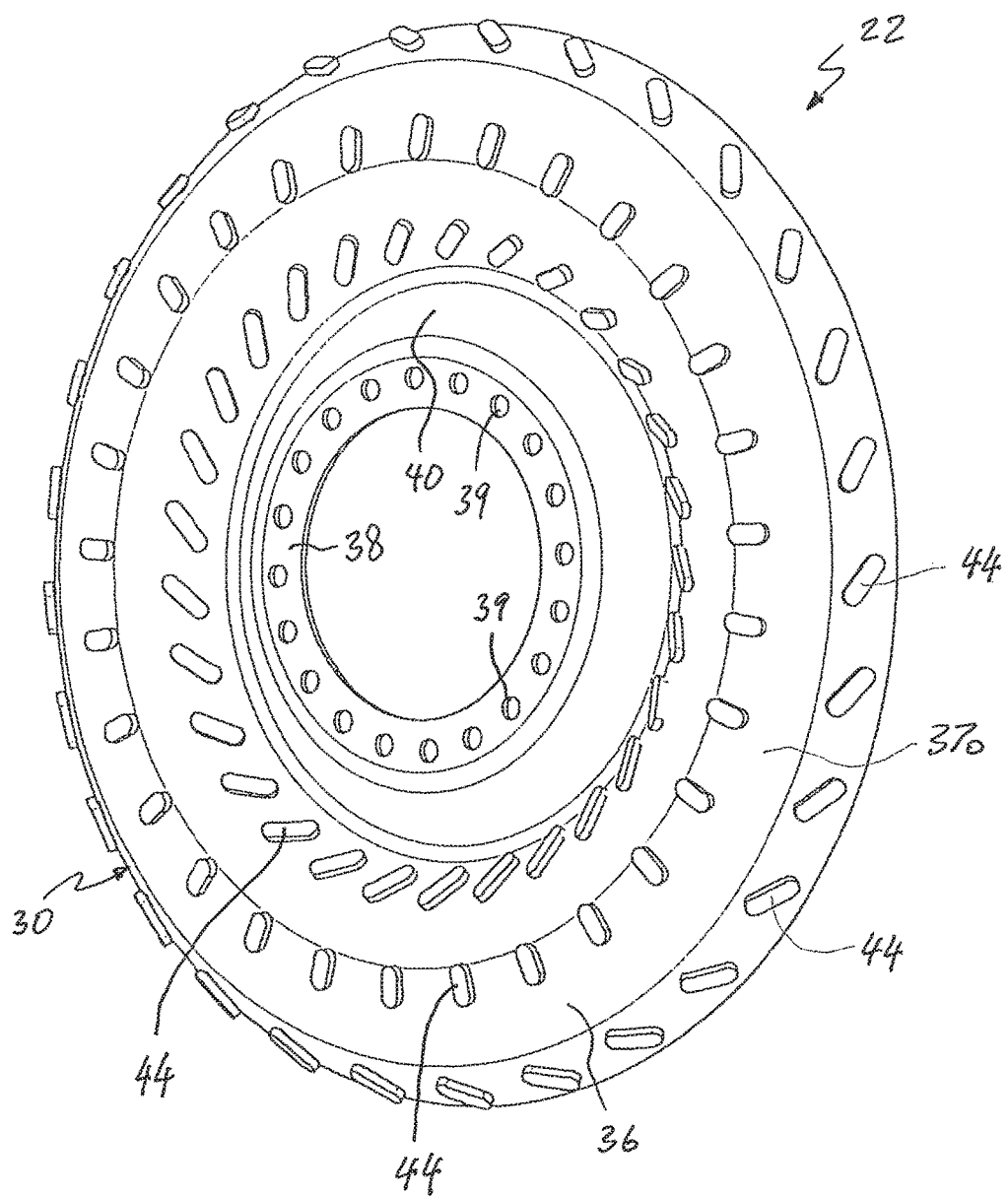
FIG. 8 is a perspective view from rear of the turbine shell portion with the in situ molded turbine blades of the turbine wheel in accordance with the first exemplary embodiment of the present invention.

The polymeric turbine blades 34 are molded as a single-piece component directly (i.e., in situ or molded-in-place) onto the axially inner peripheral surface 37i of the turbine shell portion 36 of the turbine shell member 30. The polymeric material of the turbine blades 34 flows through (or penetrates into) the mounting slots 42 in the turbine shell portion 36 for directly (i.e., without any fasteners) holding the turbine blades 34 non-moveably secured (i.e., fixed) on the turbine shell portion 36. As best shown in FIGS. 4 and 7, the turbine blades 34 are formed on the axially inner peripheral surface 37i of the turbine shell portion 36. Moreover, as best shown in FIG. 4, the polymeric material of the turbine blades 34 is molded through the mounting slots 42 in the turbine shell portion 36 so as to form molding protrusions 45 through the mounting slots 42 and mounting heads 44 of the turbine blades 34 disposed on the axially outer peripheral surface 37o of the turbine shell portion 36 for holding the turbine blades 34 in place on the turbine shell portion 36. Each of the mounting heads 44 of the turbine blades 34 at least partially, preferably entirely, covers one of the mounting slots 42 in the turbine shell portion 36, as best shown in FIG. 4. As best shown in FIG. 8, each of the turbine blades 34 is preferably formed with three (3) mounting heads 44. In other words, a portion of the polymeric material of each of the turbine blades 34 is disposed in one of the mounting slots 42 through the turbine shell portion 36. The turbine blades 34 of the turbine wheel 22 are thereby fixedly (i.e., non-movably) secured to the turbine shell portion 36 of the turbine wheel 22. Each of the in situ molded turbine blades 34 has an axially rear edge 35r engaging the axially inner peripheral surface 37i of the turbine shell portion 36, and an axially front edge 35f oriented axially opposite the axially rear edge 35r of the turbine blade 34.

According to the first exemplary embodiment of the present invention, the annular turbine core ring 32 is non-moveably secured (or fixed) to the turbine blades 34 by appropriate means known in the art, such as, for example, ultrasonic welding or friction welding. Specifically, the annular turbine core ring 32 is fixed to the axially front edge 35f of each of the turbine blades 34 of the turbine wheel 22, as best shown in FIGS. 6-8. Further according to the first exemplary embodiment of the present invention, the turbine core ring 32 is made of a polymeric material (or polymer) including technical plastics, such as polyamide-imides (such as Torlon™), polyether ether ketone (PEEK), a thermoplastic polymer (an organic thermoplastic polymer in the polyaryletherketone (PAEK) family), nylon and carbon fibers (e.g., Carbon Fiber CFF™), and resins, such as PLASTCure Rigid, etc.

An exemplary method for assembling the turbine wheel 22 according to the first exemplary embodiment will now be explained. It should be understood that this exemplary method may be practiced in connection with the other embodiments described herein. This exemplary method is not the exclusive method for assembling the hydrokinetic torque coupling devices described herein. While the method for assembling the turbine wheel 22 may be practiced by sequentially performing the steps as set forth below, it should be understood that the methods may involve performing the steps in different sequences. It should also be understood that alternative methods may be practiced within the scope of the invention.

First, the turbine shell member 30 (made of metal, preferably steel sheet) is provided with a plurality of the mounting slots 42 formed through the turbine shell portion 36 of the turbine shell member 30, which are radially and circumferentially spaced from each other.

Second, the turbine blades 34 are molded (preferably injection molded) within a mold cavity formed by a mold. Initially, the turbine shell member 30 is placed into a first half of the mold. The first half of the mold includes a plurality of voids for forming the mounting heads 44 of the turbine blades 34 to be disposed on the axially outer peripheral surface 37o of the turbine shell portion 36. Then, the mold is closed by a second half of the mold. The second half of the mold includes cavities shaped for forming the turbine blades 34. After the mold cavity is closed the turbine blades 34 are injection molded within the mold cavity that is filled with the polymeric material. The mold cavity remains closed for a period sufficient to allow the turbine blades to harden. Moreover, depending upon the polymer material being used, the mold may be heated to enhance reaction time or it may be cooled in order to remove reaction heat. Thus, the polymeric turbine blades 34 are molded directly (i.e., in situ or molded-in-place) onto the axially inner peripheral surface 37i of the turbine shell portion 36 of the turbine shell member 30. During the molding process, as best shown in FIGS. 4 and 8, material of the turbine blades 34 flows through the mounting slots 42 in the turbine shell portion 36 so as to form the molding protrusions 45 through the mounting slots 42 and the mounting heads 44 of the turbine blades 34 disposed on the axially outer peripheral surface 37o of the turbine shell portion 36. As best shown in FIG. 8, each of the turbine blades 34 is formed with three (3) mounting heads 44. The turbine blades 34 of the turbine wheel 22 are thereby fixedly secured to the turbine shell portion 36 of the turbine wheel 22.

Then, the annular turbine core ring 32 of the turbine wheel 22 is provided. Next, the turbine core ring 32 is mounted to the turbine blades 34 coaxially with the turbine shell member 30 and ultrasonically or frictionally welded to the turbine blades 34 of the turbine shell member 30.

Figure 9:
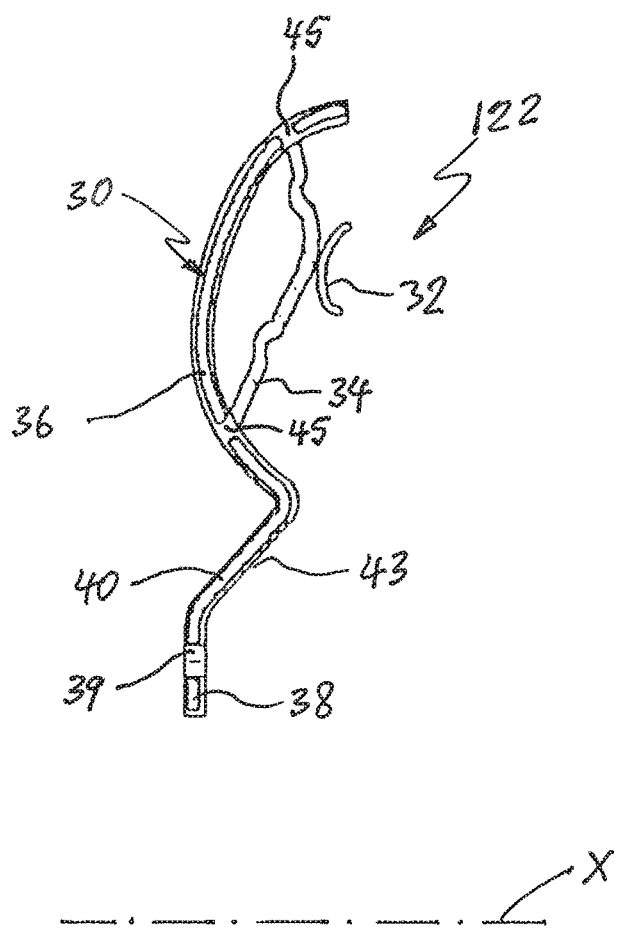
FIG. 9 is a partial sectional view of a turbine wheel in accordance with a second exemplary embodiment of the present invention.

In a hydrokinetic torque-coupling device 110 of a second exemplary embodiment illustrated in FIGS. 1 and 9, the turbine wheel 22 of the torque converter 14 is replaced by a turbine wheel 122 of a torque converter 114. The hydrokinetic torque coupling device 110 of FIGS. 1 and 9 corresponds substantially to the hydrokinetic torque coupling device 10 of FIGS. 1-8, and portions, which differ, will therefore be explained in detail below.

The turbine wheel 122, as best shown in FIG. 9, comprises a substantially annular turbine shell member 30 rotatable about the rotational axis X, and a plurality of in situ molded turbine blades 34 fixedly (i.e., non-moveably) secured to the turbine shell member 30 and inwardly extending from the turbine shell member 30 so as to face the impeller blades 26 of the impeller wheel 20. The turbine shell member 30 of the turbine wheel 122 is non-movably (i.e., fixedly) secured to the output member 19 of the torsional vibration damper 18 by appropriate means, such as by rivets 29 or other mechanical fasteners extending through the openings 39 through the turbine flange portion 38 (as best shown in FIG. 9), or by welding.

The annular turbine shell member 30 of the turbine wheel 122 is entirely encased in a layer 43 of a polymeric material, as illustrated in FIG. 9. Specifically, when the polymeric material is injection molded within the mold cavity to form the in situ molded turbine blades 34, the annular turbine shell member 30 is overmolded by the polymeric material of the turbine blades 34 so as to form the layer 43 of the polymeric material entirely encasing the turbine shell member 30.

Various modifications, changes, and alterations may be practiced with the above-described embodiment.

In a hydrokinetic torque-coupling device 210 of a third exemplary embodiment illustrated in FIGS. 1 and 10-12, the turbine wheel 22 of the torque converter 14 is replaced by a turbine wheel 222 of a torque converter 214. The hydrokinetic torque coupling device 210 of FIGS. 1 and 10-12 corresponds substantially to the hydrokinetic torque coupling device 10 of FIGS. 1-8, and portions, which differ, will therefore be explained in detail below.

Figure 10:
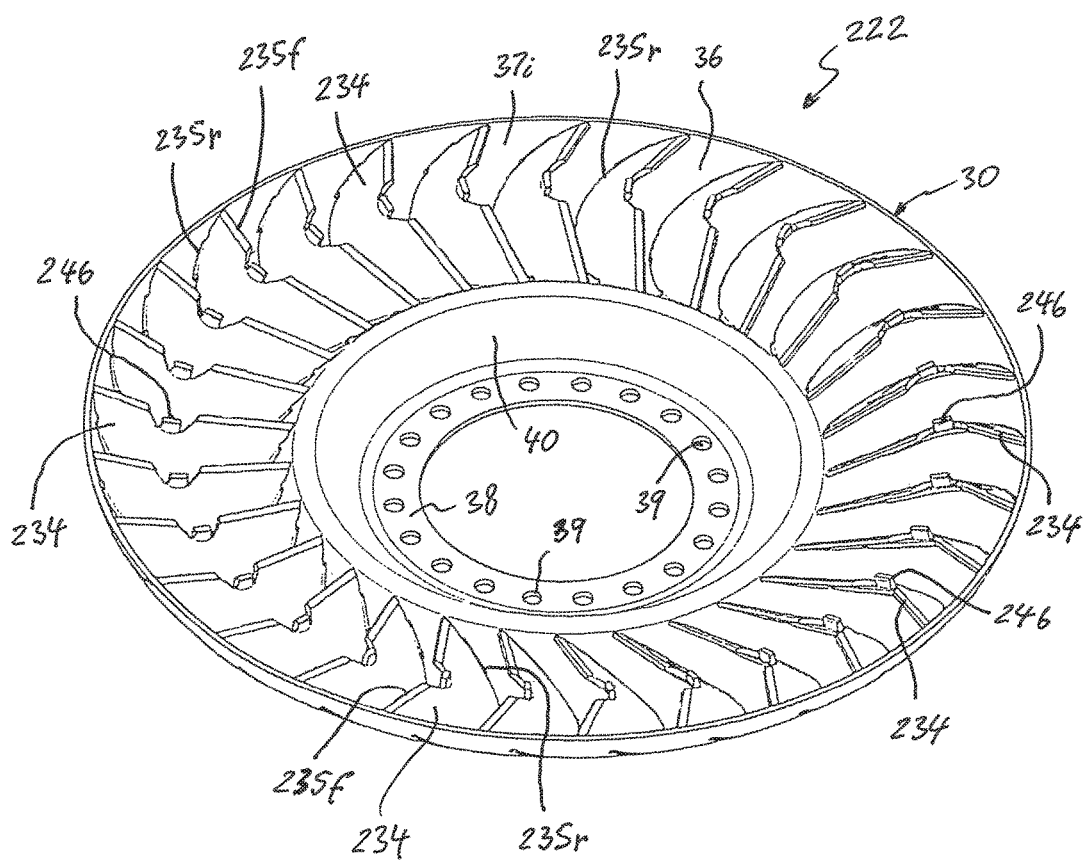
FIG. 10 is a front perspective view of a turbine shell portion with in situ molded turbine blades of a turbine wheel in accordance with a third exemplary embodiment of the present invention.
Figure 11:
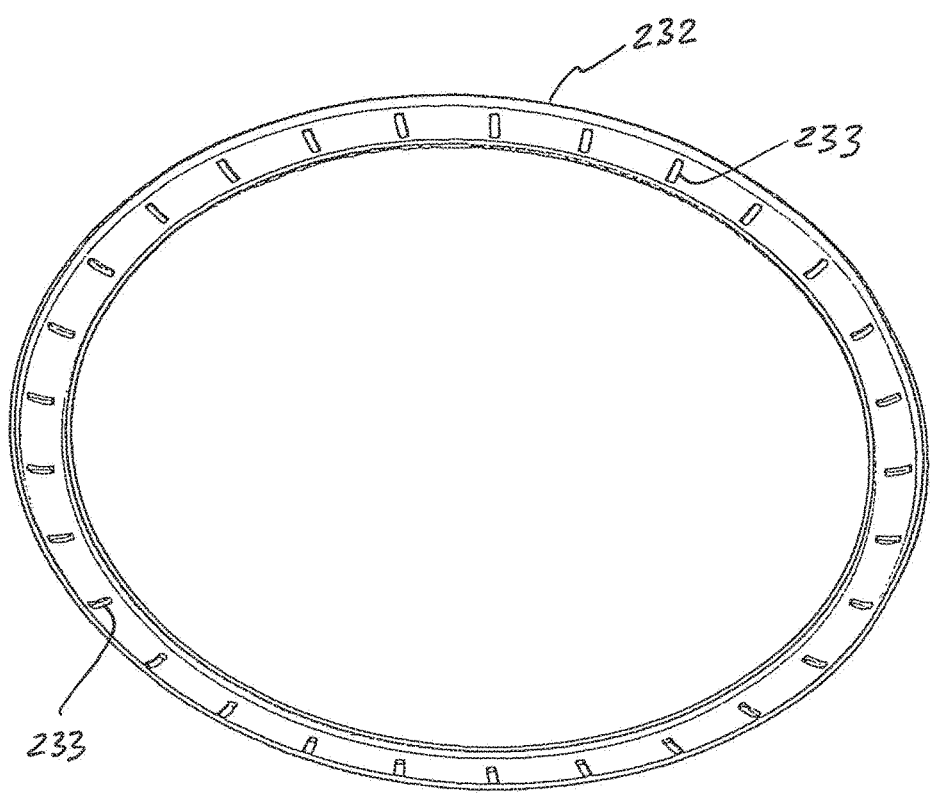
FIG. 11 is a perspective view of a turbine core ring of the turbine wheel in accordance with the third exemplary embodiment of the present invention.
Figure 12:
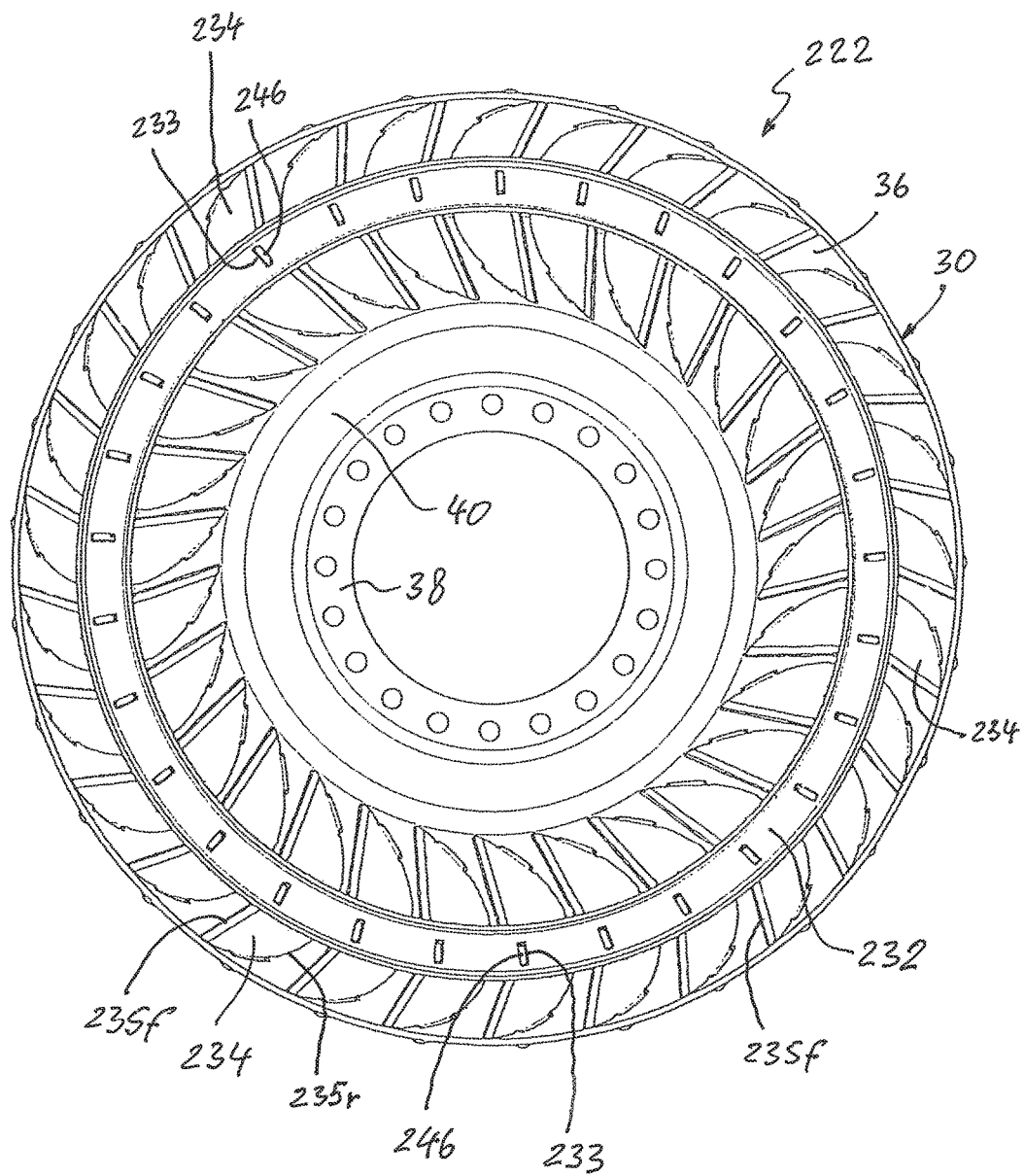
FIG. 12 is a front view of the turbine wheel in accordance with the third exemplary embodiment of the present invention.

The turbine wheel 222, as best shown in FIGS. 10-12, comprises a substantially annular turbine shell member 30, a substantially annular turbine core ring 232, and a plurality of turbine blades 234 axially extending between the turbine shell member 30 and the turbine core ring 232. The turbine blades 234 extend axially inwardly from the turbine shell member 30 so as to face the impeller blades 26 of the impeller wheel 20. The turbine blades 234 are non-movably (i.e., fixedly) secured between the turbine shell member 30 and the turbine core ring 232 of the turbine wheel 222. In other words, the turbine blades 234 of the turbine wheel 222 are fixedly secured to both the turbine shell portion 36 of the turbine shell member 30 and the turbine core ring 232 of the turbine wheel 222.

The turbine core ring 232 of the turbine wheel 222 is provided with a plurality of mounting slots 233 formed through the turbine core ring 232, as best shown in FIG. 11. According to the third exemplary embodiment of the present invention, the turbine core ring 232 is made of a polymeric material or a metal, such as steel or aluminum.

According to the third exemplary embodiment of the present invention, the turbine blades 234 are made of a polymeric material (or polymer) including technical plastics, such as polyamide-imides (such as Torlon™), polyether ether ketone (PEEK), a thermoplastic polymer (an organic thermoplastic polymer in the polyaryletherketone (PAEK) family), nylon and carbon fibers (e.g., Carbon Fiber CFF™), and resins, such as PLASTCure Rigid, etc. The polymeric turbine blades 234 are molded directly (i.e., in situ or molded-in-place) onto the axially inner peripheral surface 37i of the turbine shell portion 36 of the turbine shell member 30. The polymeric material of the turbine blades 234 flows through (or penetrates into) the mounting slots 42 in the turbine shell portion 36 for holding the turbine blades 234 non-moveably secured (i.e., fixed) on the turbine shell portion 36. As best shown in FIGS. 10-12, the turbine blades 234 are formed on the axially inner peripheral surface 37i of the turbine shell portion 36. Moreover, the polymeric material of the turbine blades 234 is molded through the mounting slots 42 in the turbine shell portion 36 so as to form mounting heads (similar to the mounting heads 44 shown in FIG. 8) of the turbine blades 234 disposed on the axially outer peripheral surface 37o of the turbine shell portion 36. Each of the mounting heads of the turbine blades 234 at least partially, preferably entirely, covers one of the mounting slots 42 in the turbine shell portion 36, similarly to the mounting heads 44 shown in FIG. 4. In other words, a portion of the polymeric material of each of the turbine blades 234 is disposed in one of the mounting slots 42 through the turbine shell portion 36. The turbine blades 234 of the turbine wheel 222 are thereby fixedly (i.e., non-movably) secured to the turbine shell portion 36 of the turbine wheel 222. Each of the in situ molded turbine blades 234 has an axially rear edge 235r engaging the axially inner peripheral surface 37i of the turbine shell portion 36, and an axially front edge 235f oriented axially opposite the axially rear edge 235r of the turbine blade 234.

Each of the turbine blades 234 includes a front mounting tab 246 molded unitarily therewith on the axially front edge 235*f* of the turbine blade 234, and configured to be received and retained in one of the mounting slots 233 through the turbine core ring 232. Moreover, the front mounting tabs 246 of the turbine blades 234 are complementary to the mounting slots 233 of the turbine core ring 232. Each of the front mounting tabs 246 of the turbine blades 234 is configured to be received in one of the mounting slots 233 of the turbine core ring 232 of the turbine wheel 222. The axially front edge 235*f* of the turbine blade 234 engages the turbine core ring 232 in an assembled state of the turbine wheel 222 so that the front mounting tabs 246 of the turbine blades 234 are received in the mounting slots 233 of the turbine core ring 232 of the turbine wheel 222 and adhesively bonded thereto, as best shown in FIG. 12.

A method for assembling the turbine wheel 222 according to the third exemplary embodiment is as follows. First, the turbine shell member 30 (made of metal, preferably steel sheet) is provided with a plurality of the mounting slots 42 formed through the turbine shell portion 36 of the turbine shell member 30, which are radially and circumferentially spaced from each other. Second, the turbine blades 234 are molded (preferably injection molded) within a mold cavity formed by a mold. Initially, the turbine shell member 30 is placed into a first half of the mold. Then, the mold is closed by a second half of the mold. The second half of the mold includes cavities shaped for forming the turbine blades 234. After the mold cavity is closed the turbine blades 234 are injection molded within the mold cavity by the polymeric material. As noted earlier, the mold cavity may be heated or cooled depending upon the reaction kinetics of the polymer. Thus, the polymeric turbine blades 234 are molded directly (i.e., in situ or molded-in-place) onto the axially inner peripheral surface 37*i* of the turbine shell portion 36 of the turbine shell member 30. Moreover, as best shown in FIG. 10, each of the turbine blades 234 is formed with the front mounting tab 246 molded unitarily therewith on the axially front edge 235*f* of the turbine blade 234. The turbine blades 234 are thereby fixedly secured to the turbine shell portion 36 of the turbine wheel 222.

Then, the annular turbine core ring 232 of the turbine wheel 222 is provided with a plurality of the mounting slots 233 formed through the turbine core ring 232. Next, the turbine core ring 232 is mounted on the axially front edge 235*f* of the turbine blades 234 coaxially with the turbine shell member 30 so that the front mounting tabs 246 of the turbine blades 234 are received in the mounting slots 233 in the turbine core ring 232 and adhesively bonded thereto.

Various modifications, changes, and alterations may be practiced with the above-described embodiment.

In a hydrokinetic torque-coupling device 310 of a fourth exemplary embodiment illustrated in FIGS. 1 and 13-14, the turbine wheel 222 of the torque converter 214 is replaced by a turbine wheel 322 of a torque converter 314. The hydrokinetic torque coupling device 310 of FIGS. 1 and 13-14 corresponds substantially to the hydrokinetic torque coupling device 10 of FIGS. 1 and 10-12, and portions, which differ, will therefore be explained in detail below.

The turbine wheel 322, as best shown in FIGS. 13-14, comprises a substantially annular turbine shell member 30, a substantially annular turbine core ring 232, and a plurality of turbine blades 334 axially extending between the turbine shell member 30 and the turbine core ring 232. The turbine blades 334 extend axially inwardly from the turbine shell member 30 so as to face the impeller blades 26 of the impeller wheel 20. The turbine blades 334 are non-movably (i.e., fixedly) secured between the turbine shell member 30 and the turbine core ring 232 of the turbine wheel 322. In other words, the turbine blades 334 of the turbine wheel 322 are fixedly secured to both the turbine shell portion 36 of the turbine shell member 30 and the turbine core ring 232 of the turbine wheel 322.

According to the fourth exemplary embodiment of the present invention, the turbine blades 334 are made of a polymeric material (or polymer) including technical plastics, such as polyamide-imides (such as Torlon™), polyether ether ketone (PEEK), a thermoplastic polymer (an organic thermoplastic polymer in the polyaryletherketone (PAEK) family), nylon and carbon fibers (e.g., Carbon Fiber CFF™), and resins, such as PLASTCure Rigid, etc. The polymeric turbine blades 334 are molded directly (i.e., in situ or molded-in-place) onto the axially inner peripheral surface 37*i* of the turbine shell portion 36 of the turbine shell member 30. The polymeric material of the turbine blades 334 flows through (or penetrates into) the mounting slots 42 in the turbine shell portion 36 for holding the turbine blades 34 non-moveably secured (i.e., fixed) on the turbine shell portion 36. As best shown in FIGS. 13-14, the turbine blades 334 are formed on the axially inner peripheral surface 37*i* of the turbine shell portion 36. Moreover, the polymeric material of the turbine blades 334 is molded through the mounting slots 42 in the turbine shell portion 36 so as to form mounting heads (similar to the mounting heads 44 shown in FIG. 8) of the turbine blades 334 disposed on the axially outer peripheral surface 37*o* of the turbine shell portion 36. Each of the mounting heads of the turbine blades 334 at least partially, preferably entirely, covering one of the mounting slots 42 in the turbine shell portion 36, similarly to the mounting heads 44 shown in FIG. 4. In other words, a portion of the polymeric material of each of the turbine blades 334 is disposed in one of the mounting slots 42 through the turbine shell portion 36. The turbine blades 334 of the turbine wheel 322 are thereby fixedly (i.e., non-movably) secured to the turbine shell portion 36 of the turbine wheel 322. Each of the in situ molded turbine blades 334 has an axially rear edge 335*r* engaging the axially inner peripheral surface 37*i* of the turbine shell portion 36, and an axially front edge 335*f* oriented axially opposite the axially rear edge 335*r* of the turbine blade 334.

Each of the turbine blades 334 includes an axially front mounting tab 346 molded unitarily therewith on the axially front edge 335*f* of the turbine blade 334. Moreover, the front mounting tabs 246 of the turbine blades 234 are complementary to the mounting slots 233 of the turbine core ring 232. Each of the front mounting tabs 346 of the turbine blades 234 is configured to be received in and axially extend through one of the mounting slots 233 of the turbine core ring 232 of the turbine wheel 322. The axially front edge 335*f* of the turbine blade 334 engages the turbine core ring 232 in an assembled state of the turbine wheel 322 so that the front mounting tabs 346 of the turbine blades 334 axially extend through the mounting slots 233 of the turbine core ring 232 of the turbine wheel 222 and staked thereto so as to form staked heads 348, as best shown in FIG. 14, to fixedly secure the turbine core ring 232 to the turbine blades 334. Each of the staked heads 348 is formed on one of the turbine blades 334 so that the turbine core ring 232 is disposed between the axially front edge 335*f* of the turbine blade 334 and the staked head 348 thereof.

A method for assembling the turbine wheel 322 according to the third exemplary embodiment is as follows. First, the turbine shell member 30 (made of metal, preferably steel sheet) is provided with a plurality of the mounting slots 42 formed through the turbine shell portion 36 of the turbine shell member 30, which are radially and circumferentially spaced from each other. Second, the turbine blades 334 are molded (preferably injection molded) within a mold cavity formed by a mold. Initially, the turbine shell member 30 is placed into a first half of the mold. Then, the mold is closed by a second half of the mold. The second half of the mold includes cavities forming the turbine blades 334. After the mold cavity is closed the turbine blades 334 are injection molded within the mold cavity by the polymeric material. Thus, the polymeric turbine blades 334 are molded directly (i.e., in situ or molded-in-place) onto the axially inner peripheral surface 37*i* of the turbine shell portion 36 of the turbine shell member 30. The mold cavity may be heated or cooled depending upon the reaction kinetics of the selected polymer. Moreover, as best shown in FIG. 13, each of the turbine blades 334 is formed with the front mounting tab 346 molded unitarily therewith on the axially front edge 335*f* of the turbine blade 334. The turbine blades 334 are thereby fixedly secured to the turbine shell portion 36 of the turbine wheel 322.

Then, the annular turbine core ring 332 of the turbine wheel 322 is provided with a plurality of the mounting slots 333 formed through the turbine core ring 332. Next, the turbine core ring 332 is mounted on the axially front edge 335*f* of the turbine blades 334 coaxially with the turbine shell member 30 so that the front mounting tabs 346 of the turbine blades 334 extend through the mounting slots 233 in the turbine core ring 232 so that a free distal end of each of the front mounting tabs 346 of the turbine blades 334 is disposed outside the turbine core ring 232, as best shown in FIG. 13 showing the turbine wheel 322 before hot staking.

Afterward, the front mounting tabs 346 of the turbine blades 334 extending through the mounting slots 333 in the turbine core ring 332 are staked by appropriate technique, preferably hot (or heat) staked, so as to form staked heads 348, as best shown in FIG. 14, which fixedly secure the turbine core ring 332 to the turbine blades 334. Various modifications, changes, and alterations may be practiced with the above-described embodiment.

Staking is known in the art as a process of connecting two components by creating an interference fit between the two pieces. One component has a hole in it while the other has a protrusion that fits within the hole. The protrusion is very slightly undersized so that it forms a slip fit. A staking punch is then used to expand the protrusion radially and to compress the protrusion axially so as to form an interference fit between the workpieces. This forms a permanent joint. The hot (or heat) staking, is the same process except that it uses heat to deform the plastic protrusion, instead of cold forming. A plastic stud or tab protruding from one component fits into a hole in the second component. The stud or tab is then deformed through the softening of the plastic to form a head which mechanically locks the two components together. The staking technique is quick, economical and consistent. Unlike welding techniques, staking has the capacity to join plastics to other materials (e.g. metal) in addition to joining like or dissimilar plastics, and it has the advantage over other mechanical joining methods in eliminating the need for consumables such as rivets and screws. The heat staking can be performed with a wide variety of techniques, such as thermal tooling, thermal punch (or hot punch), ultrasonic staking, infrared staking.

The foregoing description of the exemplary embodiment(s) of the present invention has been presented for the purpose of illustration in accordance with the provisions of the Patent Statutes. It is not intended to be exhaustive or to limit the invention to the precise forms disclosed. The embodiments disclosed hereinabove were chosen in order to best illustrate the principles of the present invention and its practical application to thereby enable those of ordinary skill in the art to best utilize the invention in various embodiments and with various modifications as suited to the particular use contemplated, as long as the principles described herein are followed. This application is therefore intended to cover any variations, uses, or adaptations of the invention using its general principles. Further, this application is intended to cover such departures from the present disclosure as come within known or customary practice in the art to which this invention pertains. Thus, changes can be made in the above-described invention without departing from the intent and scope thereof. It is also intended that the scope of the present invention be defined by the claims appended thereto.

What is claimed is:

1. A turbine wheel for a hydrokinetic torque converter, the turbine wheel rotatable about a rotational axis and comprising:
    an annular turbine shell member coaxial with the rotational axis and made of metallic material, the turbine shell member having an axially inner peripheral surface and an axially outer peripheral surface axially opposite to the axially inner peripheral surface; and
    a plurality of turbine blades extending from the axially inner peripheral surface of the turbine shell member;
    each of the turbine blades made of polymeric material as a single-piece component and directly non-moveably secured to the turbine shell member.

2. The turbine wheel as defined in claim 1, wherein the turbine shell member has a plurality of mounting slots formed therethrough, and wherein each of the turbine blades is secured to the turbine shell member by extending through one of the mounting slots in the turbine shell member between the axially inner and outer peripheral surfaces of the turbine shell member and at least partially covering one of the mounting slots from both the axially inner and outer peripheral surfaces of the turbine shell member.

3. The turbine wheel as defined in claim 2, wherein each of the turbine blades has a molding protrusion extending through one of the mounting slots in the turbine shell member between the axially inner and outer peripheral surfaces of the turbine shell member, and a mounting head at least partially covering one of the mounting slots from the axially outer peripheral surface of the turbine shell member.

4. The turbine wheel as defined in claim 1, further comprising an annular turbine core ring coaxial with the turbine shell member, wherein the turbine core ring is non-moveably secured to the turbine blades axially opposite to the turbine shell member.

5. The turbine wheel as defined in claim 4, wherein the turbine core ring has a plurality of mounting slots, and wherein each of the turbine blades has an axially front mounting tab extending through one of the mounting slots in the turbine core ring.

6. The turbine wheel as defined in claim 5, wherein the front mounting tab has a staked head formed on each of the turbine blades so that the turbine core ring is disposed between an axially front edge of the turbine blade and the staked head thereof.

7. A hydrokinetic torque converter rotatable about a rotational axis, the torque converter comprising:
    an impeller wheel coaxial with the rotational axis, the impeller wheel including an impeller shell and a plurality of impeller blades outwardly extending from the impeller shell; and a turbine wheel disposed axially opposite to the impeller wheel, the turbine wheel coaxially aligned with and hydro-dynamically drivable by the impeller wheel, the turbine wheel comprising an annular turbine shell member coaxial with the rotational axis and made of metallic material, the turbine shell member having an axially inner peripheral surface and an axially outer peripheral surface axially opposite to the axially inner peripheral surface; and a plurality of turbine blades extending from the axially inner peripheral surface of the turbine shell member;

each of the turbine blades made of polymeric material as a single-piece component and directly non-moveably secured to the turbine shell member.

8. The hydrokinetic torque converter as defined in claim 7, wherein the turbine shell member has a plurality of mounting slots formed therethrough, and wherein each of the turbine blades is secured to the turbine shell member by extending through one of the mounting slots in the turbine shell member between the axially inner and outer peripheral surfaces of the turbine shell member and at least partially covering one of the mounting slots from both the axially inner and outer peripheral surfaces of the turbine shell member.

9. The hydrokinetic torque converter as defined in claim 8, wherein each of the turbine blades has a molding protrusion extending through one of the mounting slots in the turbine shell member between the axially inner and outer peripheral surfaces of the turbine shell member, and a mounting head at least partially covering one of the mounting slots from the axially outer peripheral surface of the turbine shell member.

10. The hydrokinetic torque converter as defined in claim 7, further comprising an annular turbine core ring coaxial with the turbine shell member, wherein the turbine core ring is non-moveably secured to the turbine blades axially opposite to the turbine shell member.

11. A method for manufacturing a turbine wheel for a hydrokinetic torque converter, the method comprising the steps of:

forming an annular turbine shell member of a metallic material, the turbine shell member having an inner peripheral surface and an outer peripheral surface axially opposite to the axially inner peripheral surface;

forming a plurality of turbine blades in situ on the axially inner peripheral surface of the turbine shell member, each of the turbine blades formed in situ of a polymeric material as a single-piece component and directly non-moveably secured to the turbine shell member.

12. The method as defined in claim 11, wherein the step of in situ forming includes the step of in situ molding of the turbine blades.

13. The method as defined in claim 12, wherein the turbine shell member is formed with plurality of mounting slots formed therethrough, and wherein the step of in situ molding includes extending the polymeric material of the turbine blades through one of the mounting slots in the turbine shell member between the axially inner and outer peripheral surfaces of the turbine shell member so that each of the turbine blades at least partially covers one of the mounting slots from both the axially inner and outer peripheral surfaces of the turbine shell member.

14. The method as defined in claim 13, wherein the step of in situ molding includes forming molding protrusions through the mounting slots of the turbine shell member between the axially inner and outer peripheral surfaces of the turbine shell member.

15. The method as defined in claim 14, wherein the step of in situ molding further includes forming mounting heads of the turbine blades disposed on the axially outer peripheral surface of the turbine shell member.

16. The method as defined in claim 12, wherein the step of in situ molding includes overmolding the turbine shell member by the polymeric material of the turbine blades so as to form a layer of the polymeric material encasing the turbine shell member.

17. The method as defined in claim 11, further comprising the steps of providing an annular turbine core ring, and non-moveably securing the turbine core ring to the turbine blades axially opposite to the turbine shell member.

18. The method as defined in claim 17, wherein the turbine core ring is non-moveably secured to the turbine blades by one of ultrasonic welding and friction welding.

19. The method as defined in claim 17, wherein the turbine core ring is formed with a plurality of mounting slots, and wherein each of the turbine blades has an axially front mounting tab extending axially through one of the mounting slots in the turbine core ring.

20. The method as defined in claim 19, wherein the step of non-moveably securing the turbine core ring to the turbine blades includes the step of adhesively bonding the turbine core ring to the turbine blades of the turbine wheel.

21. The method as defined in claim 19, wherein the step of non-moveably securing the turbine core ring to the turbine blades includes the step of staking the front mounting tabs of the turbine blades extending through the mounting slots in the turbine core ring so as to form staked heads, and wherein each of the staked heads is formed on one of the turbine blades so that the turbine core ring is disposed between an axially front edge of the turbine blade and the staked head thereof.

* * * * *